(12) United States Patent
Yang

(10) Patent No.: US 9,274,692 B2
(45) Date of Patent: Mar. 1, 2016

(54) REMOTE CONTROL SYSTEM FOR PRESENTATION

(71) Applicant: Primax Electronics Ltd., Neihu, Taipei (TW)

(72) Inventor: Hai-Hung Yang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 164 days.

(21) Appl. No.: 14/225,049

(22) Filed: Mar. 25, 2014

(65) Prior Publication Data
US 2015/0169192 A1  Jun. 18, 2015

(30) Foreign Application Priority Data

Dec. 17, 2013  (TW) .............................. 102146621 A

(51) Int. Cl.
| | |
|---|---|
| *G06F 3/00* | (2006.01) |
| *G06F 3/0484* | (2013.01) |
| *G08C 17/02* | (2006.01) |
| *G08C 19/16* | (2006.01) |

(52) U.S. Cl.
CPC ............ *G06F 3/04842* (2013.01); *G08C 17/02* (2013.01); *G08C 19/16* (2013.01); *G08C 2201/30* (2013.01)

(58) Field of Classification Search
None
See application file for complete search history.

(56) References Cited

U.S. PATENT DOCUMENTS

| | | | | |
|---|---|---|---|---|
| 2006/0075348 A1* | 4/2006 | Xu | ......................... | G06F 3/0481 715/730 |
| 2007/0226625 A1* | 9/2007 | Cardone | ................ | G06Q 90/00 715/732 |
| 2010/0121818 A1* | 5/2010 | Sun | .................... | G06F 17/30176 707/627 |
| 2011/0271191 A1* | 11/2011 | King | ....................... | H04L 67/38 715/719 |
| 2012/0159403 A1* | 6/2012 | Capan | ............... | G06F 17/30017 715/863 |
| 2014/0298179 A1* | 10/2014 | Chen | ................... | H04L 67/2823 715/730 |

* cited by examiner

*Primary Examiner* — Stephen Alvesteffer
(74) *Attorney, Agent, or Firm* — Kirton McConkie; Evan R. Witt

(57) ABSTRACT

A computer executes a presentation file to display a presentation frame. An input device generates an input signal in response to a user's operation to have the computer execute a presentation control instruction. There is a signal processing protocol between a remote driver of the computer and a server driver of another computer, wherein the two computers are communicable with each other via a network, for standardizing a packing process and an unpacking process of the input signal. The server driver executes the packing process of the input signal according to the signal processing protocol and transmits the processed input signal out to the another computer. The remote driver executes the unpacking process of the input signal to have the another computer execute the presentation control instruction on the presentation frame. In this manner, the another computer may display the same presentation frame as that displayed by the computer.

30 Claims, 5 Drawing Sheets

REMOTE CONTROL SYSTEM FOR PRESENTATION

FIELD OF THE INVENTION

The present invention relates to a remote control system, and more particularly to a remote control system for presentation.

BACKGROUND OF THE INVENTION

With the development of information industry, presentation software executed by a computer is a common tool for facilitating expression of ideas or facts for a variety of purposes at a variety of places. Generally, the computer installed with the presentation software is connected to a projector to enlarge the picture to be shown in front of the audience. The speaker then manipulates the execution of the presentation software to play presentation contents and associated operations, e.g. turning pages, moving cursor, highlighting paragraphs, etc., with an input device such as a mouse device.

Nowadays, the use of portable computers or tablets in lieu of a projector for presentation is getting more and more popular. For example, in classes, the students or audience store the presentation file in their computers or tablets, and follow the instructions of the teacher or speaker to operate the presentation file while the teacher or speaker is making presentation with the presentation file.

In general, it is hard to have each of the audience precisely follow the instructions of the speaker to operate the presentation file, and it is difficult for the speaker to know if the audience have synchronized the frames shown on their computer screens with the page being explained. This would limit the effect of the presentation.

SUMMARY OF THE INVENTION

An object of the present invention is to provide a remote control system for presentation. Particularly, the remote control system for presentation synchronizes the frames shown on the computer screens of the audience with the frame shown on the computer screen of the speaker.

In an aspect, the present invention provides a remote control system for presentation, which comprises:
a first digital processing device including a USB port, a server driver and a network transmitting unit, and executing a presentation file to display a presentation frame;
a second digital processing device including a network receiving unit and a remote driver, wherein the network receiving unit is communicable with the network transmitting unit via a network, and controlled to display the same presentation frame as that displayed by the first digital processing device; and
an input device in communication with the USB port, generating a USB signal in response to an operation of a user thereon, thereby having the first digital processing device execute a presentation control instruction on the presentation frame;
wherein there is a signal processing protocol between the remote driver and the server driver for standardizing a packing process and an unpacking process of the USB signal, the server driver executes the packing process of the USB signal received by the USB port according to the signal processing protocol and transmits the USB signal having been processed by the packing process out from the network transmitting unit to the network receiving unit, and the remote driver executes the unpacking process of the USB signal received by the network receiving unit so as to have the second digital processing device execute the presentation control instruction on the presentation frame.

In another aspect, the present invention provides a remote control system for presentation, which comprises:
a first digital processing device including an input port, a server driver, a network transmitting unit and a signal converting unit, and executing a presentation file to display a presentation frame;
a second digital processing device including a network receiving unit and a remote driver, wherein the network receiving unit is communicable with the network transmitting unit via a network, and controlled to display the same presentation frame as that displayed by the first digital processing device; and
an input device in communication with the input port, generating an input signal in response to an operation of a user thereon, thereby having the first digital processing device execute a presentation control instruction on the presentation frame;
wherein there is a signal processing protocol between the remote driver and the server driver for standardizing a packing process and an unpacking process of the USB signal, the signal converting unit converts the input signal into a USB signal, the server driver executes the packing process of the USB signal received by the USB port according to the signal processing protocol and transmits the USB signal having been processed by the packing process out from the network transmitting unit to the network receiving unit, and the remote driver executes the unpacking process of the USB signal received by the network receiving unit so as to have the second digital processing device execute the presentation control instruction on the presentation frame.

In a further aspect, the present invention provides a remote control system for presentation, which comprises:
a first digital processing device including an input device, a server driver, a network transmitting unit and a signal converting unit, and executing a presentation file to display a presentation frame, wherein the input device generates an input signal in response to an operation of a user thereon so as to have the first digital processing device execute a presentation control instruction on the presentation frame, and the signal converting unit converts the input signal into a USB signal; and
a second digital processing device including a network receiving unit and a remote driver, wherein the network receiving unit is communicable with the network transmitting unit via a network, and controlled to display the same presentation frame as that displayed by the first digital processing device, wherein there is a signal processing protocol between the remote driver and the server driver for standardizing a packing process and an unpacking process of the USB signal,
wherein the server driver executes the packing process of the USB signal received by the USB port according to the signal processing protocol and transmits the USB signal having been processed by the packing process out from the network transmitting unit to the network receiving unit, and the remote driver executes the unpacking process of the USB signal received by the network receiving unit so as to have the second digital processing device execute the presentation control instruction on the presentation frame.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention is illustrated in reference with embodiments and drawings as follows.

Figure 1:
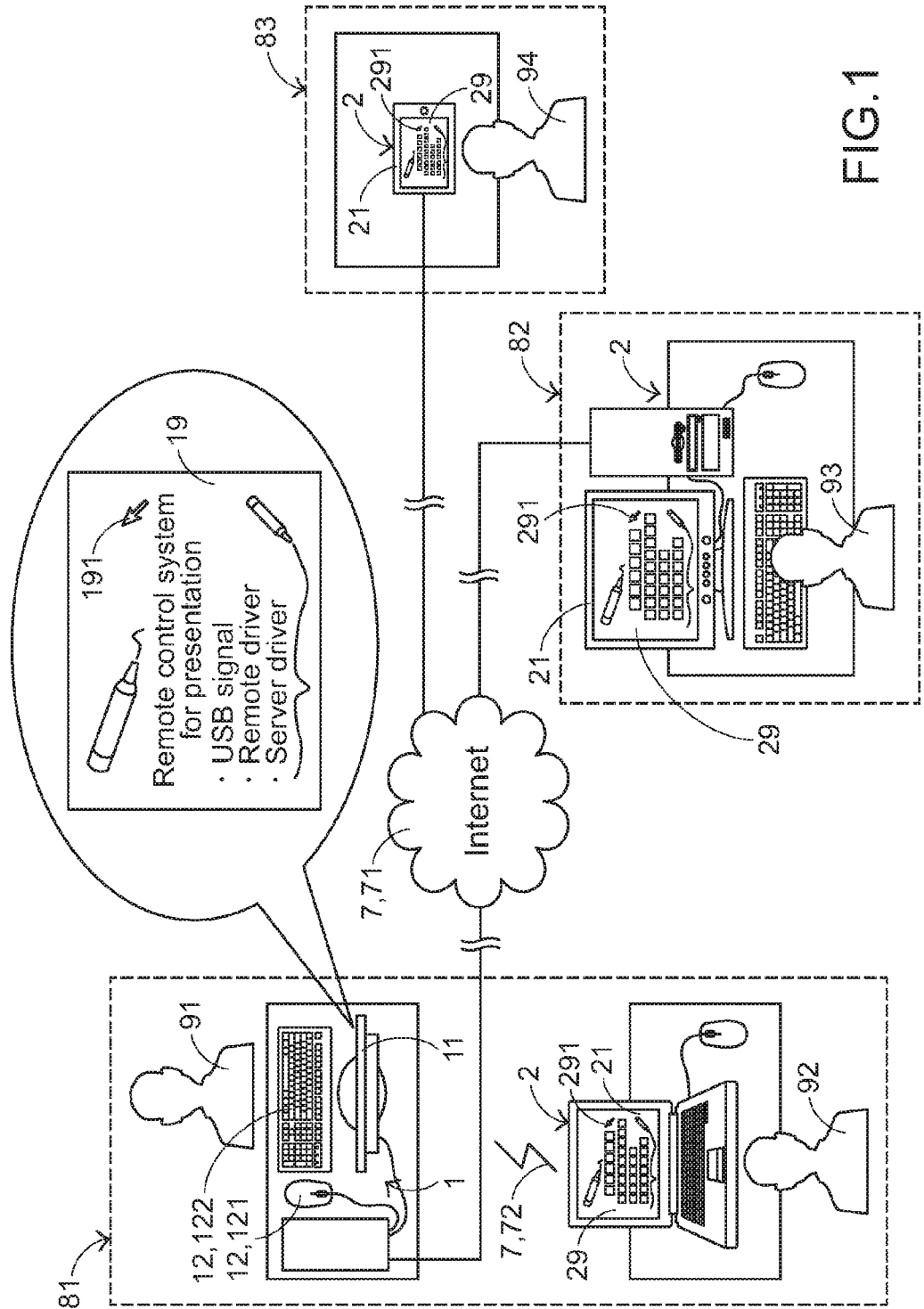
FIG. 1 is a scheme illustrating an application example of a remote control system for presentation according to an embodiment of the present invention.

First of all, a process of presentation is described. Please refer to FIG. 1, which is a scheme illustrating an application example of a remote control system for presentation according to an embodiment of the present invention. As shown in FIG. 1, a speaker 91 and a plurality of listeners 92, 93, 94 are associated with the remote control system for presentation. The speaker 91 and the listeners 92, 93, 94 do not have to be under the same roof. Instead, they may be present in different spaces, e.g. in separate rooms 81, 82 and 83. The speaker 91 and the listeners 92, 93, 94 take part in the presentation with individual digital processing devices. The digital processing devices, for example, can be desktop computers, laptop computers, tablets, mobile phones, etc.

In the digital processing device 1 of the speaker 91, hereinafter the first digital processing device, a presentation file is stored. The presentation file, for example, can be a Microsoft PowerPoint document file, a Microsoft Word document file, an Adobe PDF document file, etc. When executing the presentation file, the first digital processing device 1 of the speaker 91 shows the contents of the presentation on the screen 11. Then the speaker 91 may control the frames 19 shown on the screen 11 to, for example, move the cursor 191, turn pages or edit the file, by way of an input device 12 such as a keyboard 122 or a mouse 121.

Meanwhile, the same presentation file as that executed in the first digital processing device 1 should also be stored in each of the digital processing devices of the listeners 92, 93, 94, hereinafter the second digital processing device. Then the listeners 92, 93, 94 have their digital processing devices 2 execute the presentation file to show the contents of the presentation on the screens 21. It is to be noted that according to the present invention, the frames 19 shown on the screens 21 of the second digital processing devices 2 will synchronize with those shown on the screen 11 of the first processing device 1.

According to the present invention, the first digital processing device 1 communicates with the second digital processing devices 2 via network 7, e.g. Internet 71 or local network 72. Therefore, the first digital processing device 1 and the second digital processing devices 2 are installed with driving units, e.g. driver programs, communicable through a common protocol. For example, the first digital processing device 1 transmits signals to each of the second digital processing devices 2 via a Universal Serial Bus (USB) so that the speaker 91 may control the frames shown on the screen 11 of the first digital processing device 1 while synchronizing the frames shown on the screens 21 of the second digital processing devices 2. Accordingly, the displayed pages on the screens 21 can be automatically turned and the cursors on the screens 21 can be automatically moved in synchronization with the operation of the speaker 91 on the first digital processing device 1. In this manner, the listeners 92, 93, 94 can well follow the speaker 91 to effectively catch the points that the speaker 91 intends to express.

Figure 2:
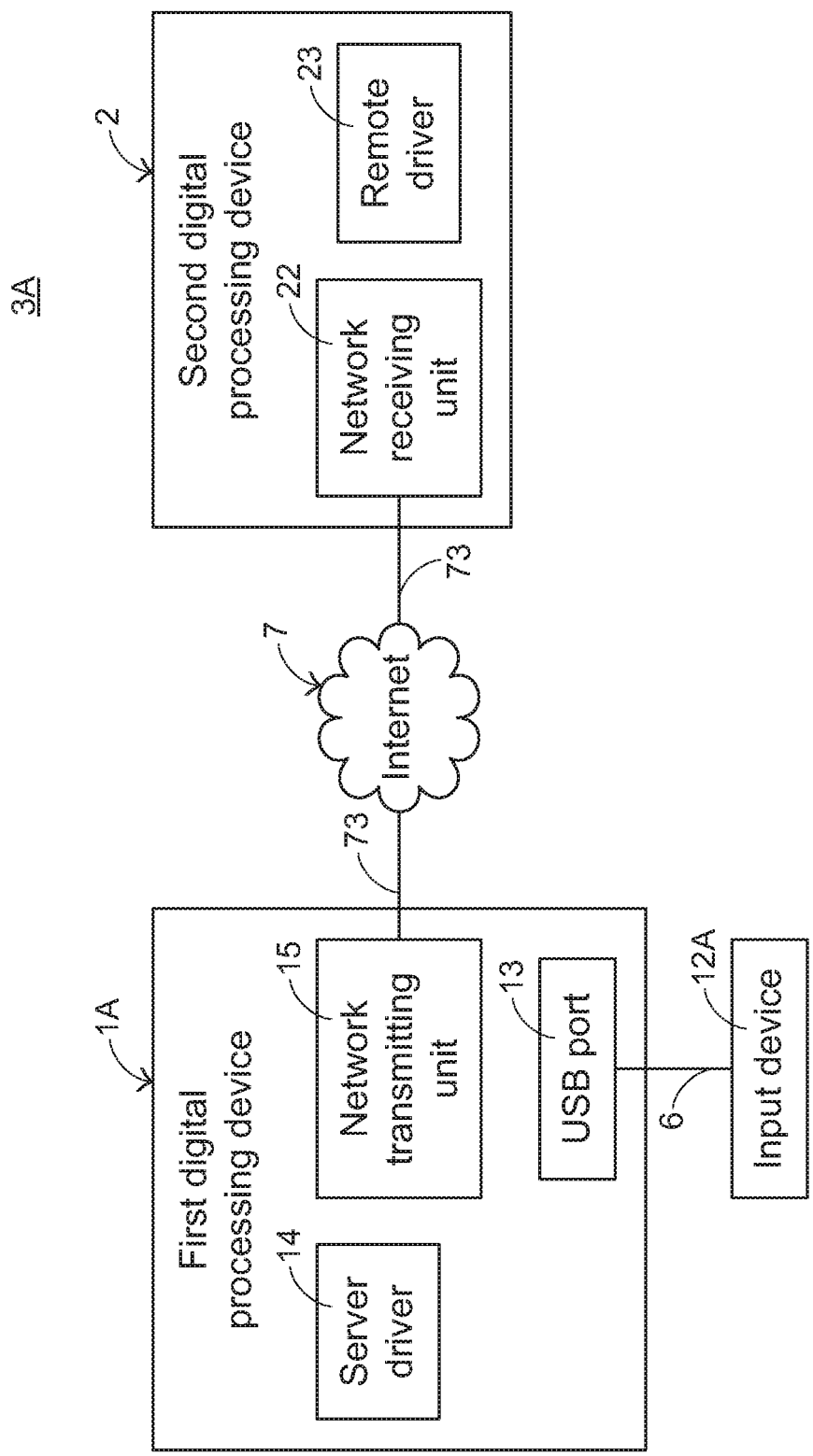
FIG. 2 is a block diagram schematically illustrating a remote control system for presentation according to a first embodiment of the present invention.

Operational principles of a remote control system according to a first embodiment of the present invention are now described with reference to FIG. 2, which is a block diagram schematically illustrating the remote control system. The remote control system 3A includes a first digital processing device 1A, a second digital processing device 2 and an input device 12A. The first digital processing device 1A includes a USB port 13, a server driver 14, and a network transmitting unit 15. The second digital processing device 2 includes a network receiving unit 22 and a remote driver 23. The network receiving unit 22 communicates with the network transmitting unit 15 via the network 7. In this embodiment, the network transmitting unit 15 and the network receiving unit 22 are network output port and network input port, respectively, and communicate with the network 7 complying with TCP/IP communication protocol via respective cables 73. Alternatively, the network transmitting unit 15 and the network receiving unit 22 are wireless network transmitter and wireless network receiver, respectively, and communicate with the network 7 in a wireless manner.

The input device 12A is connected to a universal serial bus (USB) port of the first digital processing device 1A via a USB cable 6, and operated by the speaker 91 to generate USB signals. The USB signals generated by the input device 12A are transmitted to the first digital processing device 1A sequentially via the USB cable 6 and the USB port 13 so as to have the first digital processing device 1A execute corresponding presentation control instructions on the presentation frame.

In this embodiment, the first digital processing device 1A is a desktop computer, and the second digital processing devices 2 can be desktop computers, notebook computers or handheld mobile devices such as tablets or smart phones. The input device 12A, for example, may be a mouse device 121 or a keyboard 122. When the speaker 91 uses a mouse 121 to control the process of presentation, the USB signals generated by the input device 12A includes a coordinate signal and a roller signal. Accordingly, the first digital processing device 1A can execute instructions for cursor movement on the presentation frame 19 corresponding to the coordinate signal so as to move the cursor 191 on the presentation frame 19. In addition, the instructions for page turning of the presentation frame 19 corresponding to the roller signal can also be executed.

When the speaker 91 uses a keyboard 122 to control the process of presentation, the USB signals generated by the input device 12A includes a keyboard code signal. Accordingly, the first digital processing device 1A can execute instructions for data input on the presentation frame 19 corresponding to the keyboard code signal. It is understood that the designs described above are for examples only, and those skilled in the art may properly modify the designs according to practical requirements. For example, a touch pad can be used instead of the mouse 121 to have the first digital processing device 1A execute instructions for cursor movement on the presentation frame 19. In another example, the first digital processing device 1A may be a notebook computer with a built-in keyboard, and thus the input device connected to the first digital processing device 1A via the USB cable 6 is a mouse 121 only.

In this embodiment, the server driver 14 and the remote driver 23 may be, but not limited to, server driver program and remote driver program installed in the first digital processing device 1A and the second digital processing devices 2, respectively. For example, the server driver 14 and the remote driver 23 may also be server software application program (APP) and remote software application program (APP) installed in the first digital processing device 1A and the second digital processing devices 2, respectively.

The server driver 14 of the first digital processing device 1A and the remote driver 23 of each of the second digital processing devices 2 communicate with each other with a signal processing protocol, which is used for standardizing the packing process and unpacking process, and outputting the USB signals, which are packed as packets, to respective network receiving units 22 of the second digital processing devices 2 via the network transmitting unit 15. The remote drivers 23 of the second digital processing devices 2 then execute the unpacking process of the USB signals received from the network receiving units 22 according to the signal processing protocol. As such, the second digital processing devices 2 can execute the same presentation control instruction as those executed in the first digital processing device 1A on the frame 19. In other words, the speaker 91 is able to synchronously control the presentation frame 19 of the first digital processing device 1A and the presentation frame 29 of the second digital processing devices 2. For example, the presentation frame 19 of the first digital processing device 1A and the presentation frame 29 of the second digital processing devices 2 can be turned to next page simultaneously, or the cursor 191 on the presentation frame 19 of the first digital processing device 1A and the cursor 291 of the presentation frame 29 of the second digital processing devices 2 can be moved to the corresponding positions.

Figure 3:
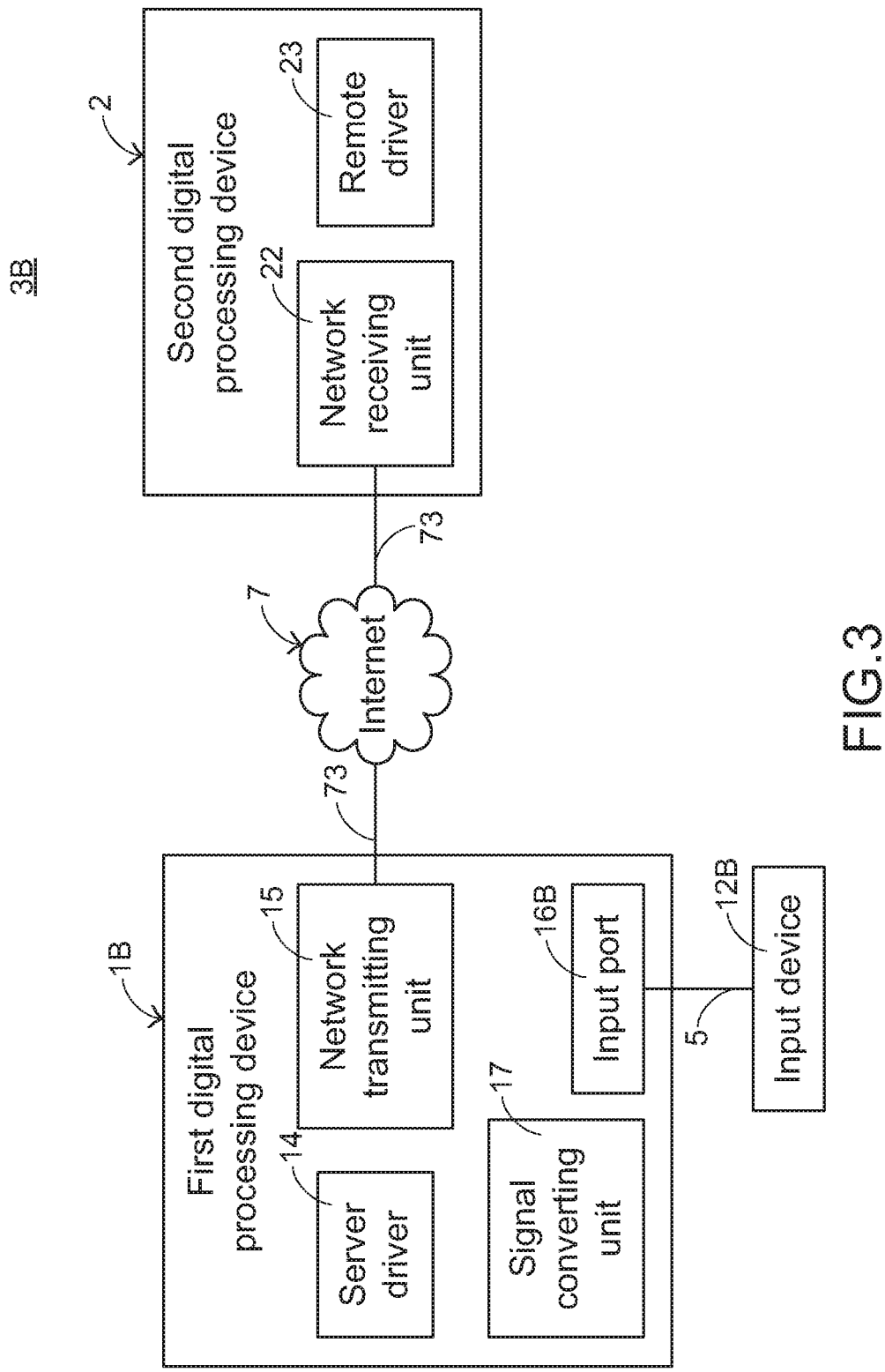
FIG. 3 is a block diagram schematically illustrating a remote control system for presentation according to a second embodiment of the present invention.

Please refer to FIG. 3, which is a block diagram schematically illustrating a remote control system for presentation according to a second embodiment of the present invention. The remote control system 3B for presentation according to this embodiment is similar to that described in the first embodiment according to the present invention. Therefore, it is not to be redundantly described herein. The present embodiment differs from the first embodiment in that the first digital processing device 1B further includes an input port 16B, which is a non-USB interface, and a signal converting unit 17, which is coupled to the input port 16B. For example, the input port 16B is a cable input port. An input device 12B is connected to the input port 16B via a non-USB cable 5. For example, the input device 12B is connected to the input port 16B with a PS/2 cable, and generates input signals in response to the operation of the speaker 91. The signal converting unit 17 converts the input signals received by the input port 16B into USB signals.

Therefore, when the input port 16B of the first digital processing device 1B receives the input signal generated by the input device 12B, in addition to executing corresponding presentation control instructions on the presentation frame 19, the first digital processing device 1B has the signal converting unit 17 thereof convert the input signal into a USB signal. Then the server driver 14 executes a packing process of the USB signal according to the signal processing protocol, and the USB signal having been processed by the packing process is transmitted out from the network transmitting unit 15 to the network receiving units 22 of the second digital processing devices 2. The remote driver 23 of each of the second digital processing devices 2 then executes an unpacking process of the USB signal received by the network receiving unit 22. As such, the second digital processing devices 2 can execute the same presentation control instructions on the presentation frame 29 as those executed in the first digital processing device 1B.

Figure 4:
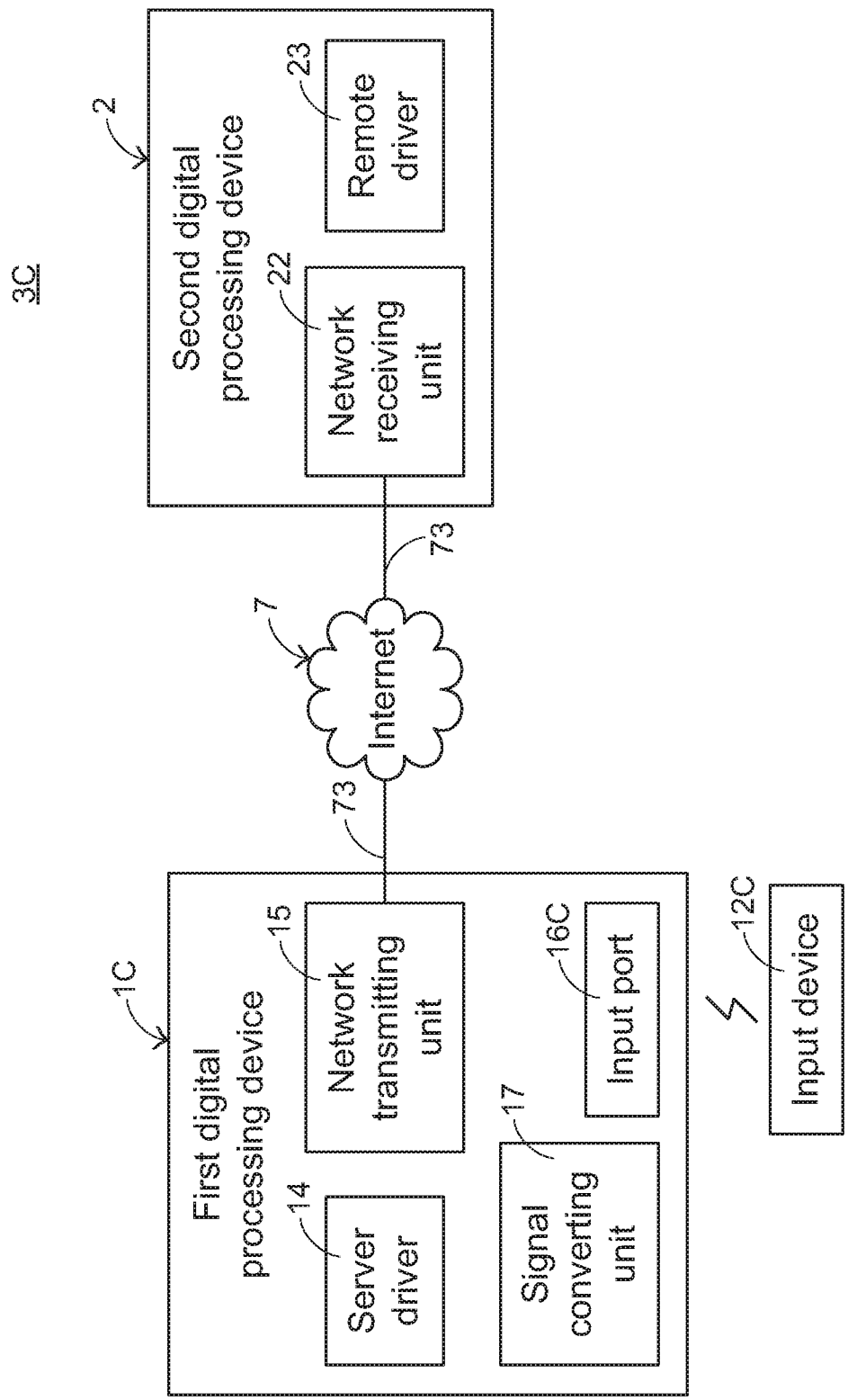
FIG. 4 is a block diagram schematically illustrating a remote control system for presentation according to a third embodiment of the present invention.

Please refer to FIG. 4, which is a block diagram schematically illustrating a remote control system for presentation according to a third embodiment of the present invention. The remote control system 3C for presentation according to this embodiment is similar to that described in the second embodiment according to the present invention. Therefore, it is not to be redundantly described herein. The present embodiment differs from the second embodiment in that the input port 16C of the first digital processing device 1C is a wireless input port, and the input device 12C, in response to the operation of the speaker 91, generates and transmits input signals to the input port 16C in a wireless manner, e.g. by way of wireless network, Bluetooth, etc.)

Figure 5:
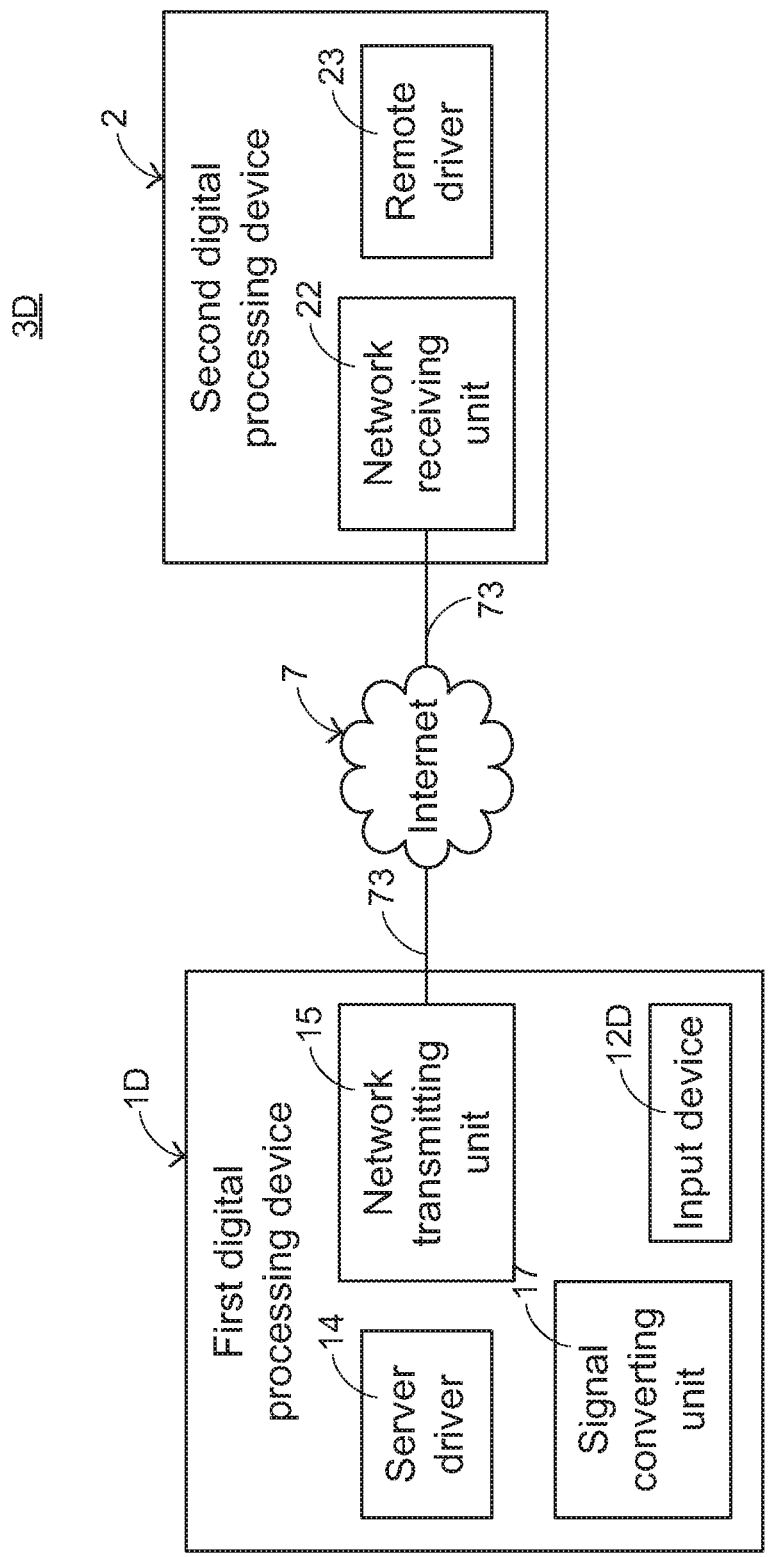
FIG. 5 is a block diagram schematically illustrating a remote control system for presentation according to a fourth embodiment of the present invention.

Please refer to FIG. 5, which is a block diagram schematically illustrating a remote control system for presentation according to a fourth embodiment of the present invention. The remote control system 3D for presentation according to this embodiment is similar to that described in the second embodiment according to the present invention. Therefore, it is not to be redundantly described herein. The present embodiment differs from the second embodiment in that the input port 16C of the first digital processing device 1D is built therein an input device 12D. For example, the first digital processing device 1D is a notebook computer, and the built-in input device 12D includes a keyboard and a touch pad. In another example, the first digital processing device 1D is a handheld mobile device, and the built-in input device 12D includes a touch screen. In this example, the input signal includes a coordinate signal and a touch signal. The presentation control instruction is an instruction for cursor movement corresponding to the coordinate signal, or the presentation control instruction is an instruction for page turning corresponding to the touch signal.

Therefore, when the input device 12D of the first digital processing device 1D, in response to the operation of the speaker 91, generates the input signals, in addition to executing corresponding presentation control instructions on the presentation frame 19, the first digital processing device 1D has the signal converting unit 17 thereof convert the input signal into a USB signal. Then the server driver 14 executes a packing process of the USB signal according to the signal processing protocol, and the USB signal having been processed by the packing process is transmitted out from the network transmitting unit 15 to the network receiving units 22 of the second digital processing devices 2. The remote driver 23 of each of the second digital processing devices 2 then executes an unpacking process of the USB signal received by the network receiving unit 22. As such, the second digital processing devices 2 can execute the same presentation control instructions on the presentation frame 29 as those executed in the first digital processing device 1D.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A remote control system for presentation, comprising:
a first digital processing device including a USB port, a server driver and a network transmitting unit, and executing a presentation file to display a presentation frame;
a second digital processing device including a network receiving unit and a remote driver, wherein the network receiving unit is communicable with the network transmitting unit via a network, and controlled to display the same presentation frame as that displayed by the first digital processing device; and
an input device in communication with the USB port, generating a USB signal in response to an operation of a user thereon, thereby having the first digital processing device execute a presentation control instruction on the presentation frame;
wherein there is a signal processing protocol between the remote driver and the server driver for standardizing a packing process and an unpacking process of the USB signal, the server driver executes the packing process of the USB signal received by the USB port according to the signal processing protocol and transmits the USB signal having been processed by the packing process out from the network transmitting unit to the network receiving unit, and the remote driver executes the unpacking process of the USB signal received by the network receiving unit so as to have the second digital processing device execute the presentation control instruction on the presentation frame.

2. The remote control system for presentation according to claim 1, wherein the server driver is a server driver program, and the remote driver is a remote driver program.

3. The remote control system for presentation according to claim 1, wherein the server driver is a server software application program (APP) and the remote driver is a remote software application program (APP).

4. The remote control system for presentation according to claim 1, wherein the input device includes a mouse device, the USB signal includes a coordinate signal, and the presentation control instruction is an instruction for cursor movement corresponding to the coordinate signal.

5. The remote control system for presentation according to claim 1, wherein the input device includes a mouse device, the USB signal includes a roller signal, and the presentation control instruction is an instruction for page turning corresponding to the roller signal.

6. The remote control system for presentation according to claim 1, wherein the input device includes a touch pad, the USB signal includes a coordinate signal, and the presentation control instruction is an instruction for cursor movement corresponding to the coordinate signal.

7. The remote control system for presentation according to claim 1, wherein the input device includes a keyboard device, the USB signal includes a keyboard code signal, and the presentation control instruction is an instruction for data input corresponding to the keyboard code signal.

8. The remote control system for presentation according to claim 1, wherein the first digital processing device is a computer device, and the second digital processing device is a computer device or a handheld mobile device.

9. The remote control system for presentation according to claim 1, wherein the network complies with a TCP/IP communication protocol.

10. The remote control system for presentation according to claim 1, wherein the network transmitting unit is a network output port or a wireless network transmitter, and the network receiving unit is a network input port or a wireless network receiver.

11. The remote control system for presentation according to claim 1, wherein the input port is a cable input port or a wireless input port.

12. A remote control system for presentation, comprising:
a first digital processing device including an input port, a server driver, a network transmitting unit and a signal converting unit, and executing a presentation file to display a presentation frame;
a second digital processing device including a network receiving unit and a remote driver, wherein the network receiving unit is communicable with the network transmitting unit via a network, and controlled to display the same presentation frame as that displayed by the first digital processing device; and
an input device in communication with the input port, generating an input signal in response to an operation of a user thereon, thereby having the first digital processing device execute a presentation control instruction on the presentation frame;
wherein there is a signal processing protocol between the remote driver and the server driver for standardizing a packing process and an unpacking process of the USB signal, the signal converting unit converts the input signal into a USB signal, the server driver executes the packing process of the USB signal received by the USB port according to the signal processing protocol and transmits the USB signal having been processed by the packing process out from the network transmitting unit to the network receiving unit, and the remote driver executes the unpacking process of the USB signal received by the network receiving unit so as to have the second digital processing device execute the presentation control instruction on the presentation frame.

13. The remote control system for presentation according to claim 12, wherein the server driver is a server driver program, and the remote driver is a remote driver program.

14. The remote control system for presentation according to claim 12, wherein the server driver is a server software application program (APP) and the remote driver is a remote software application program (APP).

15. The remote control system for presentation according to claim 12, wherein the input device includes a mouse device, the input signal includes a coordinate signal, and the presentation control instruction is an instruction for cursor movement corresponding to the coordinate signal.

16. The remote control system for presentation according to claim 12, wherein the input device includes a mouse device, the input signal includes a roller signal, and the presentation control instruction is an instruction for page turning corresponding to the roller signal.

17. The remote control system for presentation according to claim 12, wherein the input device includes a touch pad, the input signal includes a coordinate signal, and the presentation control instruction is an instruction for cursor movement corresponding to the coordinate signal.

18. The remote control system for presentation according to claim 12, wherein the input device includes a keyboard device, the input signal includes a keyboard code signal, and the presentation control instruction is an instruction for data input corresponding to the keyboard code signal.

19. The remote control system for presentation according to claim 12, wherein the network complies with a TCP/IP communication protocol.

20. The remote control system for presentation according to claim 12, wherein the network transmitting unit is a network output port or a wireless network transmitter, and the network receiving unit is a network input port or a wireless network receiver.

21. A remote control system for presentation, comprising:
a first digital processing device including an input device, a server driver, a network transmitting unit and a signal converting unit, and executing a presentation file to display a presentation frame, wherein the input device generates an input signal in response to an operation of a user thereon so as to have the first digital processing device execute a presentation control instruction on the presentation frame, and the signal converting unit converts the input signal into a USB signal; and
a second digital processing device including a network receiving unit and a remote driver, wherein the network receiving unit is communicable with the network transmitting unit via a network, and controlled to display the same presentation frame as that displayed by the first digital processing device, wherein there is a signal processing protocol between the remote driver and the server driver for standardizing a packing process and an unpacking process of the USB signal,
wherein the server driver executes the packing process of the USB signal received by the USB port according to the signal processing protocol and transmits the USB signal having been processed by the packing process out from the network transmitting unit to the network receiving unit, and the remote driver executes the unpacking process of the USB signal received by the network receiving unit so as to have the second digital processing device execute the presentation control instruction on the presentation frame.

22. The remote control system for presentation according to claim 21, wherein the server driver is a server driver program, and the remote driver is a remote driver program.

23. The remote control system for presentation according to claim 21, wherein the server driver is a server software application program (APP) and the remote driver is a remote software application program (APP).

24. The remote control system for presentation according to claim 21, wherein the input device includes a touch screen, the input signal includes a coordinate signal, and the presentation control instruction is an instruction for cursor movement corresponding to the coordinate signal.

25. The remote control system for presentation according to claim 21, wherein the input device includes a touch screen, the input signal includes a touch signal, and the presentation control instruction is an instruction for page turning corresponding to the touch signal.

26. The remote control system for presentation according to claim 21, wherein the input device includes a keyboard device, the input signal includes a keyboard code signal, and the presentation control instruction is an instruction for data input corresponding to the keyboard code signal.

27. The remote control system for presentation according to claim 21, wherein the input device includes a touch pad, the input signal includes a coordinate signal, and the presentation control instruction is an instruction for cursor movement corresponding to the coordinate signal.

28. The remote control system for presentation according to claim 21, wherein the first digital processing device is a computer device, and the second digital processing device is a computer device or a handheld mobile device.

29. The remote control system for presentation according to claim 21, wherein the network complies with a TCP/IP communication protocol.

30. The remote control system for presentation according to claim 21, wherein the network transmitting unit is a network output port or a wireless network transmitter, and the network receiving unit is a network input port or a wireless network receiver.

\* \* \* \* \*